(12) United States Patent
Wei (10) Patent No.: US 11,577,169 B2
(45) Date of Patent: Feb. 14, 2023

(54) GAME PERSPECTIVE CONTROL METHOD AND APPARATUS

(71) Applicant: NETEASE (HANGZHOU) NETWORK CO., LTD., Zhejiang (CN)

(72) Inventor: Yiming Wei, Zhejiang (CN)

(73) Assignee: NETEASE (HANGZHOU) NETWORK CO., LTD., Zhejiang (CN)

(*) Notice: Subject to any disclaimer, the term of this patent is extended or adjusted under 35 U.S.C. 154(b) by 62 days.

(21) Appl. No.: 16/979,192

(22) PCT Filed: Dec. 31, 2019

(86) PCT No.: PCT/CN2019/130255
§ 371 (c)(1),
(2) Date: Sep. 9, 2020

(87) PCT Pub. No.: WO2020/215792
PCT Pub. Date: Oct. 29, 2020

(65) Prior Publication Data
US 2021/0362057 A1    Nov. 25, 2021

(30) Foreign Application Priority Data

Apr. 22, 2019 (CN) .......................... 201910322004.4

(51) Int. Cl.
*A63F 13/5255* (2014.01)
*A63F 13/2145* (2014.01)
(Continued)

(52) U.S. Cl.
CPC ...... *A63F 13/5255* (2014.09); *A63F 13/2145* (2014.09); *A63F 13/426* (2014.09);
(Continued)

(58) Field of Classification Search
CPC .............. A63F 13/5255; A63F 13/2145; A63F 13/426; A63F 13/5258; A63F 13/837; A63F 13/92
See application file for complete search history.

(56) References Cited

U.S. PATENT DOCUMENTS 7,585,224 B2 * 9/2009 Dyke-Wells .......... A63F 13/837
348/240.99
2015/0094127 A1 4/2015 Canose et al.
(Continued)

FOREIGN PATENT DOCUMENTS

CN    105597310 A    5/2016
CN    107519644 A    12/2017
(Continued)

OTHER PUBLICATIONS

COCOA-K; <Unity select different game scenes by buttons>; https://blog.csdn.netweixin_38703170articledetails80310116 ; May 14, 2018.

*Primary Examiner* — Yingchuan Zhang
(74) *Attorney, Agent, or Firm* — Gang Yu (57) ABSTRACT

A game perspective control method and apparatus are provided. The method includes: in response to an character selection operation acting on a second display area of a graphical user interface, a target game character is selected in a game scene; a perspective switching control is provided on the second display area, the perspective switching control being configured to switch between a game scene area where a current position of the target game character is located and a game scene area where a target position of the target game character is located; and, in response to a perspective switching operation acting on the perspective switching control, a first display area is controlled to display a game scene corresponding to the perspective switching operation.

19 Claims, 5 Drawing Sheets

(51) Int. Cl.
*A63F 13/426* (2014.01)
*A63F 13/5258* (2014.01)
*A63F 13/837* (2014.01)
*A63F 13/92* (2014.01)

(52) U.S. Cl.
CPC ........ *A63F 13/5258* (2014.09); *A63F 13/837* (2014.09); *A63F 13/92* (2014.09)

(56) References Cited

U.S. PATENT DOCUMENTS

2019/0118078 A1* 4/2019 Li .................. G06F 3/04883
2019/0192968 A1* 6/2019 He ..................... G06F 3/14

FOREIGN PATENT DOCUMENTS

| | | |
|---|---|---|
| CN | 107617213 A | 1/2018 |
| CN | 108536353 A | 9/2018 |
| CN | 109331468 A | 2/2019 |
| CN | 109432766 A | 3/2019 |
| CN | 110193195 A | 9/2019 |
| JP | 2017-200629 A | 11/2017 |
| WO | 2019024041 A | 2/2019 |

* cited by examiner

GAME PERSPECTIVE CONTROL METHOD AND APPARATUS

CROSS-REFERENCE TO RELATED APPLICATIONS

The present disclosure claims priority to Chinese Patent with the priority No. of 201910322004.4, filed to the National Intellectual Property Administration, PRC on Apr. 22, 2019 and entitled "Game Perspective Control Method and Apparatus", the content of which is hereby incorporated by reference in its entirety.

TECHNICAL FIELD

The present disclosure relate to the technical field of games, and in particular to a game perspective control method and apparatus.

BACKGROUND

With the development of a mobile communication technology, more and more mobile terminal games have emerged. Due to the limitations of hardware conditions and interaction modes, most of control modes in traditional PC-side games cannot be transplanted to mobile terminal games, so that the mobile terminal games and the traditional PC-side games are greatly different in control modes of game perspective switching.

When switching a game perspective in a mobile terminal game in the related art, the game perspective may be switched in response to a continuous sliding operation of a player on a screen. However, an efficiency of the sliding operation is low, which will reduce a game experience of the player.

SUMMARY

At least some embodiments of the present disclosure provide a game perspective control method and apparatus, so as at least to partially solve problems of low efficiency of switching a game perspective by a sliding operation, and reduction of a game experience of a player.

In one embodiment of the present disclosure, a game perspective control method is provided, which is applied to a terminal capable of rendering a graphical user interface. The graphical user interface includes a first display area and a second display area. The first display area includes at least part of a game scene. The second display area includes a perspective movement control and a character selection control. The method includes:

in response to a character selection operation acting on the second display area of the graphical user interface, a target game character in the game scene is selected;

a perspective switching control is provided on the second display area, the perspective switching control being configured to switch between a game scene area where a current position of the target game character is located and a game scene area where a target position of the target game character is located; and in response to a perspective switching operation acting on the perspective switching control, the first display area is controlled to display a game scene corresponding to the perspective switching operation.

In an optional embodiment, a perspective switching control is provided on the second display area, including: a first perspective switching control and a second perspective switching control are displayed on the second display area.

The first perspective switching control is configured to switch from the game scene area where the current position is located to the game scene area where the target position is located, and the second perspective switching control is configured to switch from the game scene area where the target position is located to the game scene area where the current position is located.

In an optional embodiment, the first perspective switching control and the second perspective switching control are displayed on the second display area, including:

a lens movement control is displayed on the second display area, and the first perspective switching control and the second perspective switching control are displayed on each side of the lens movement control respectively.

In an optional embodiment, in response to the perspective switching operation acting on the perspective switching control, the first display area is controlled to display the game scene corresponding to the perspective switching operation, including:

in response to a first perspective switching operation acting on the first perspective switching control, the first display area is controlled to display the game scene area where the target position is located, the first perspective switching operation being an operation of sliding the lens movement control to the first perspective switching control; or, in response to a second perspective switching operation acting on the second perspective switching control, the first display area is controlled to display the game scene area where the current position is located, the second perspective switching operation being an operation of sliding the lens movement control to the first perspective switching control.

In an optional embodiment, before in response to the perspective switching operation acting on the perspective switching control, the first display area is controlled to display the game scene corresponding to the perspective switching operation, the method further includes:

in response to a second touch operation acting on the first display area, an operation position of the second touch operation is acquired; and the target position on the first display area is determined according to the operation position.

In an optional embodiment, in response to the character selection operation acting on the second display area of the graphical user interface, the target game character in the game scene is selected, including:

in response to the character selection operation acting on the second display area of the graphical user interface, an identifier of a target game character corresponding to the character selection operation is acquired; and a target character selection control corresponding to the target game character is displayed on the character selection control in a preset manner according to the identifier of the target game character.

In an optional embodiment, in response to the character selection operation acting on the second display area of the graphical user interface, the target game character in the game scene is selected, including:

in response to the character selection operation acting on the second display area of the graphical user interface, the target game character in the game scene is selected, and the first display area is controlled to display the game scene area where the current position of the target game character is located.

In an optional embodiment, the perspective switching control is provided on the second display area, including:

the perspective movement control is switched to the perspective switching control.

In an optional embodiment, the perspective movement control is a virtual joystick control, and the operation that the perspective movement control is switched to the perspective switching control includes:

the virtual joystick control is switched to the perspective switching control.

In an optional embodiment, the perspective switching control is a virtual joystick control, the first perspective switching control is a first side control of the virtual joystick control, and the second perspective switching control is a second side control of the virtual joystick control.

In an optional embodiment, the perspective movement control is configured to control the game scene area displayed on the first display area.

In another embodiment of the present disclosure, a game perspective control apparatus is provided, which is applied to a terminal capable of rendering a graphical user interface. The graphical user interface includes a first display area and a second display area. The first display area includes at least part of a game scene. The second display area includes a perspective movement control and a character selection control. The apparatus includes:

a selection component, configured to select, in response to a character selection operation acting on the second display area of the graphical user interface, a target game character in the game scene;

a providing component, configured to provide a perspective switching control on the second display area, the perspective switching control being configured to switch between a game scene area where a current position of the target game character is located and a game scene area where a target position of the target game character is located; and a control component, configured to control, in response to a perspective switching operation acting on the perspective switching control, the first display area to display a game scene corresponding to the perspective switching operation.

In an optional embodiment, the providing component is configured to:

display a first perspective switching control and a second perspective switching control on the second display area.

The first perspective switching control is configured to switch from the game scene area where the current position is located to the game scene area where the target position is located, and the second perspective switching control is configured to switch from the game scene area where the target position is located to the game scene area where the current position is located.

In an optional embodiment, the providing component is configured to:

display a lens movement control on the second display area, and display the first perspective switching control and the second perspective switching control on each side of the lens movement control respectively.

In an optional embodiment, the control component is configured to:

control, in response to a first perspective switching operation acting on the first perspective switching control, the first display area to display the game scene area where the target position is located, the first perspective switching operation being an operation of sliding the lens movement control to the first perspective switching control; or, control, in response to a second perspective switching operation acting on the second perspective switching control, the first display area to display the game scene area where the current position is located, the second perspective switching operation being an operation of sliding the lens movement control to the first perspective switching control.

In an optional embodiment, the apparatus further includes: an acquisition component.

The acquisition component is configured to: acquire, in response to a second touch operation acting on the first display area, an operation position of the second touch operation before controlling, in response to the perspective switching operation acting on the perspective switching control, the first display area to display the game scene corresponding to the perspective switching operation; and determine, according to the operation position, the target position on the first display area.

In an optional embodiment, the selection component is configured to: acquire, in response to the character selection operation acting on the second display area of the graphical user interface, an identifier of a target game character corresponding to the character selection operation; and display, according to the identifier of the game character, a target character selection control corresponding to the target game character on the character selection control in a preset manner.

In an optional embodiment, the selection component is configured to:

select, in response to the character selection operation acting on the second display area of the graphical user interface, the target game character in the game scene, and control the first display area to display the game scene area where the current position of the target game character is located.

In an optional embodiment, the providing component is configured to:

switch the perspective movement control to the perspective switching control.

In an optional embodiment, the perspective movement control is a virtual joystick control, and the providing component is configured to:

switch the virtual joystick control to the perspective switching control.

In an optional embodiment, the perspective switching control is a virtual joystick control, the first perspective switching control is a first side control of the virtual joystick control, and the second perspective switching control is a second side control of the virtual joystick control.

In an optional embodiment, the perspective movement control is configured to control the game scene area displayed on the first display area.

In another embodiment of the present disclosure, a game perspective control device is provided, which includes:

a memory, configured to store a program; and a processor, configured to execute the program stored in the memory. When the program is executed, the processor is configured to perform the method mentioned above.

In another embodiment of the present disclosure, a computer-readable storage medium is provided, which includes instructions that, when run on a computer, cause the computer to perform the method mentioned above.

The at least some embodiments of the present disclosure provide a game perspective control method and apparatus. The method includes: in response to the character selection operation acting on the second display area of the graphical user interface, the target game character in the game scene is selected; a perspective switching control is provided on the second display area, the perspective switching control being configured to switch between a game scene area where a current position of the target game character is located and a game scene area where a target position of the target game character is located; and in response to a perspective switching operation acting on the perspective switching control, the first display area is controlled to display a game scene corresponding to the perspective switching operation. Through the perspective switching control, switching between the game scene area where the current position of the game character is located and the game scene area where the target position of the target game character is located is performed on a first display area, thereby avoiding need for frequent and continuous sliding operations by a user to switch the game perspective, and improving the game experience of the user.

BRIEF DESCRIPTION OF THE DRAWINGS

In order to more clearly illustrate the technical solutions in the embodiments of the present disclosure or the related art, the drawings used in the description of the embodiments or the related art will be briefly described below. It is apparent that the drawings in the following description are some embodiments of the present disclosure, and other drawings can be obtained from those skilled in the art according to these drawings without any creative work.

DETAILED DESCRIPTION

In order to make the objectives, technical solutions, and advantages of the embodiments of the present disclosure clearer, the technical solutions in the embodiments of the present disclosure will be clearly and completely described below with reference to the drawings in the embodiments of the present disclosure. It is apparent that the described embodiments are a part of the embodiments of the present disclosure, not all of the embodiments. On the basis of the embodiments of the present disclosure, all other embodiments obtained on the premise of no creative work of those of ordinary skill in the art should fall within the scope of protection of the present disclosure.

Figure 1:
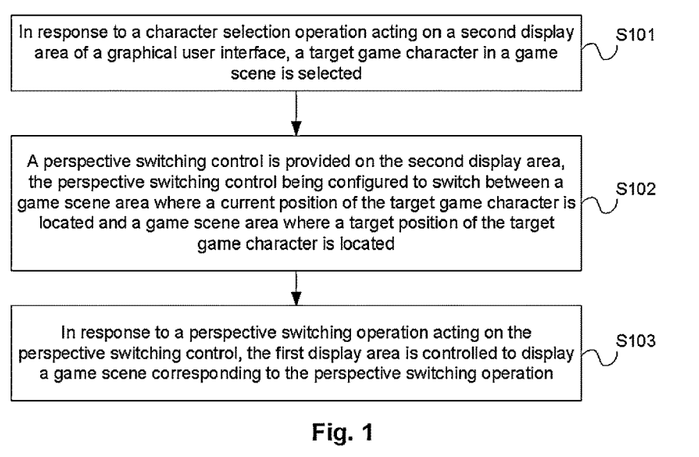
FIG. 1 is a flowchart of a game perspective control method according to a first embodiment of the present disclosure.

FIG. 1 is a flowchart of a game perspective control method according to a first embodiment of the present disclosure. As shown in FIG. 1, the method includes the following steps.

In S101, in response to a character selection operation acting on a second display area of a graphical user interface, a target game character in a game scene is selected.

Specifically, the graphical user interface refers to a computer operation user interface displayed in a graphical manner, which allows a player to use an input device to manipulate icons or menu controls on a screen. The input device may be a mouse or a touch screen, etc. The present embodiment is not limited thereto. During the game, the player operates through the graphical user interface to interact with a client or a server.

In the present embodiment, the graphical user interface includes a first display area and a second display area. The first display area includes at least part of a game scene. The second display area includes a perspective movement control and a character selection control.

Optionally, the second display area may be stacked and displayed above the first display area. Or, the first display area may also be located on the left side of the graphical user interface, and the second display area may be located on the right side of the graphical user interface. The specific implementation manner of the first display area and the second display area is not particularly limited in the embodiments of the present disclosure.

Further, when the player selects a game character in a game, a character selection operation is performed on the second display area of the graphical user interface through an input device (for example, a touch operation medium). The character selection operation may be an operation of clicking a specific character selection control, or may also be an operation of slidably selecting multiple character selection controls. The embodiments of the present disclosure do not specifically limit the specific implementation manner of the character selection operation, and the specific implementation manner may be set according to requirements.

In the present embodiment, the character selection control corresponds to a game character in a game scene. One character selection control may correspond to one game character, or may also correspond to multiple game characters, which is not limited in the present disclosure.

In response to the character selection operation, the target game character in the game scene is selected. The selected target game character may be at least one game character, for example, multiple game characters of the same type, multiple game characters of the same group (the group may be a set of game characters preset by game players/users or game applications, and the set may include multiple game characters of different types or multiple game characters of the same type), and the like.

In S102, a perspective switching control is provided on the second display area, the perspective switching control being configured to switch between a game scene area where a current position of the target game character is located and a game scene area where a target position of the target game character is located.

Further, after it is determined that the target game character is selected, the perspective switching control is provided on the second display area. The perspective switching control is configured to switch between the game scene area where a current position of the target game character is located and a game scene area where a target position of the target game character is located.

In an optional embodiment, the game scene area where the current position is located is a game scene area centered on the current position of the target game character and within a preset range size, and the target game scene area is centered on the target position of the target game character and within a preset range size. The target position may be determined according to a target specified operation of a user, for example, the target position may be determined according to a touch click operation acting on the game scene, etc., and the present disclosure is not limited herein. When there are multiple target game characters, the current position of the target game character may be determined according to the current position of one of the game characters, or determined according to the positions of multiple game characters and a preset weighting algorithm, for example, the determination position is fitted according to the positions of multiple game characters.

In an optional implementation manner, the manner of providing the perspective switching control may be providing perspective switching controls on each side of the perspective movement control. The perspective switching controls may be displayed in a semicircle or rectangular display on each side of the perspective movement control.

In another optional implementation manner, the implementation manner of providing the perspective switching control may also be switching the perspective movement control to the perspective switching control. At this time, the providing manner of the perspective movement control may be the same as the providing manner of the perspective switching control. However, a function of the perspective movement control is different from a function of the perspective switching control.

For example, both the perspective movement control and the perspective switching control may be set as virtual joysticks, but the perspective movement control may be configured to control the game scene area displayed on the first display area (it may be any existing perspective control mode; for example, the continuous movement of the game scene area displayed in the first display area is controlled by a sliding operation acting on the perspective movement control). The perspective switching control may be configured to switch between the game scene area where the current position of the target game character is located and the game scene area where the target position is located. The specific functions and setting modes may be set according to actual needs. The present embodiment does not specifically limit the specific implementation manner of providing the perspective switching control.

In S103, in response to a perspective switching operation acting on the perspective switching control, the first display area is controlled to display a game scene corresponding to the perspective switching operation.

Further, the perspective switching operation is performed on the perspective switching control. The perspective switching operation may be sliding the perspective movement control to a corresponding position of the perspective switching control, or clicking a corresponding position of the perspective switching control. The perspective switching operation is not particularly limited in the present embodiment, and those skilled in the art can understand that the specific perspective switching operation may be set as required.

Specifically, in response to the perspective switching operation acting on the perspective switching control, the first display area is controlled to display the game scene corresponding to the perspective switching operation. For example, the perspective switching control is divided into a left sub-control and a right sub-control. When the perspective switching operation is performed on the left sub-control, the game scene where the current position is located is switched to the game scene where the target position is located, and when the perspective switching operation is performed on the right sub-control, the game scene where the target position is located is switched to the game scene where the current position is located. The perspective switching control may also be set as two separate buttons, etc., and implementation manners for the two separate buttons are similar with implementation manners for the left sub-control and the right sub-control, and will not be repeated here.

The game perspective control method provided by the embodiment of the present disclosure includes: in response to the character selection operation acting on the second display area of the graphical user interface, the target game character in the game scene is selected; the perspective switching control is provided on the second display area, the perspective switching control being configured to switch between the game scene area where the current position of the target game character is located and the game scene area where the target position of the target game character is located; and in response to the perspective switching operation acting on the perspective switching control, the first display area is controlled to display the game scene corresponding to the perspective switching operation. Through a perspective switching control, switching between the game scene area where the current position of a game character is located and the game scene area where the target position is located is performed on the first display area. On the one hand, the need for frequent and continuous sliding operations by a user to switch the game perspective is avoided. On the other hand, a corresponding game scene area may be quickly switched according to a target game character selected by the user, the current game scene area of the target game character and the status of the target game scene area may be checked in time, and a game strategy may also be adjusted in time, thereby improving the game experience of the user.

On the basis of the above embodiment, the manner of providing the perspective switching control on the second display area may be displaying the perspective switching control on the second display area, or switching the perspective movement control to the perspective switching control.

The following is a detailed description of the game perspective control method provided by the embodiment of the present disclosure in conjunction with specific embodiments. First, the perspective switching control is displayed on the second display area with reference to FIG. 2 to FIG. 5 to realize the implementation of providing the perspective switching control.

Figure 2:
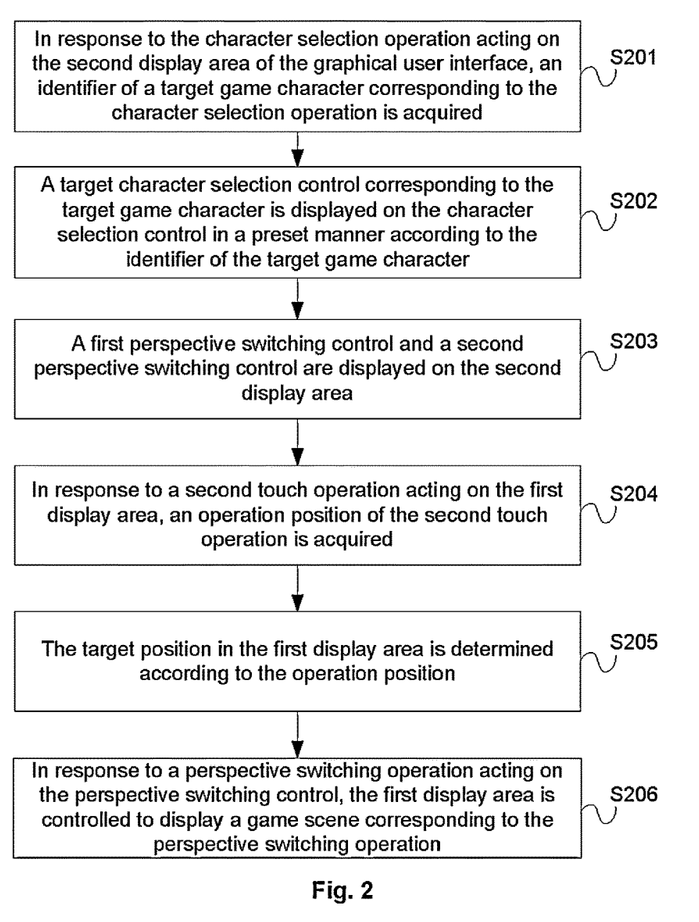
FIG. 2 is a flowchart of a game perspective control method according to a second embodiment of the present disclosure.
Figure 3:
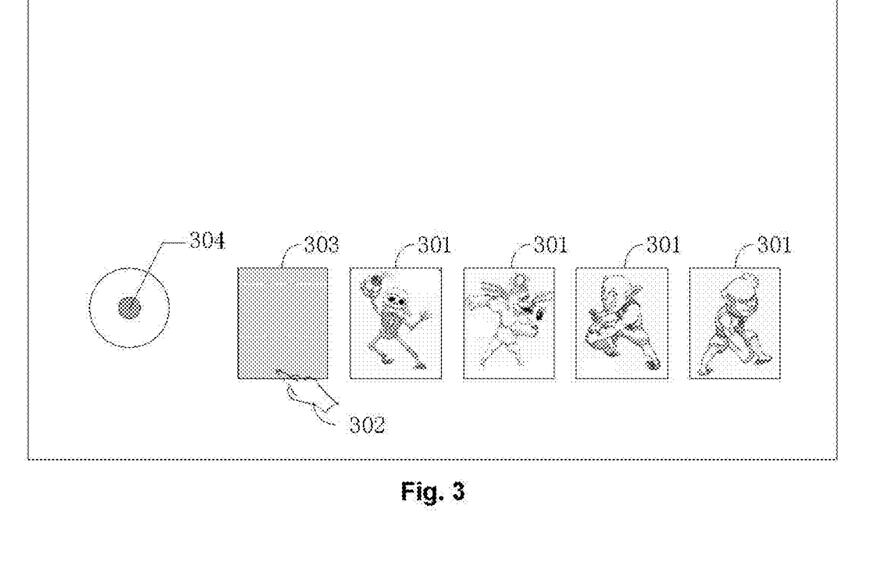
FIG. 3 is an interface schematic diagram of a game perspective control method according to a first embodiment of the present disclosure.
Figure 4:
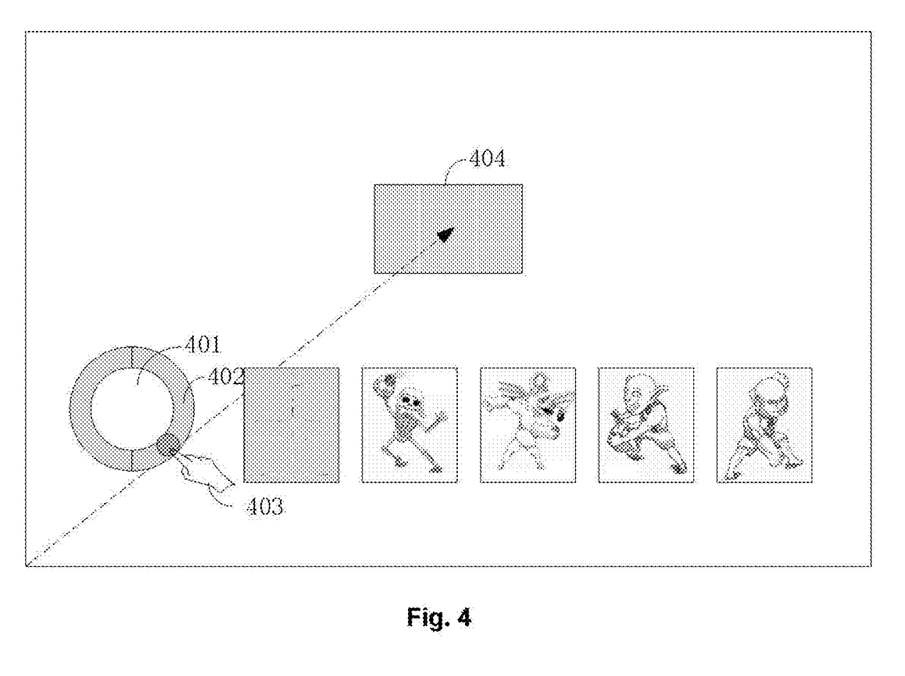
FIG. 4 is an interface schematic diagram of a game perspective control method according to a second embodiment of the present disclosure.

FIG. 2 is a flowchart of a game perspective control method according to a second embodiment of the present disclosure. FIG. 3 is an interface schematic diagram of a game perspective control method according to a first embodiment of the present disclosure. FIG. 4 is an interface schematic diagram of a game perspective control method according to a second embodiment of the present disclosure.

Figure 5:
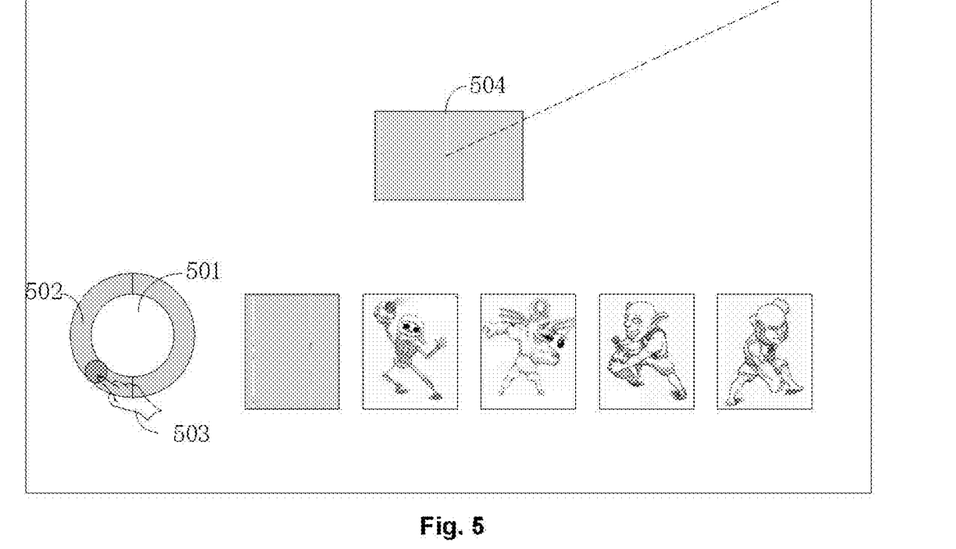
FIG. 5 is an interface schematic diagram of a game perspective control method according to a third embodiment of the present disclosure.

FIG. 5 is an interface schematic diagram of a game perspective control method according to a third embodiment of the present disclosure.

As shown in FIG. 2, the method includes the following steps.

In S201, in response to the character selection operation acting on the second display area of the graphical user interface, an identifier of a target game character corresponding to the character selection operation is acquired.

In S202, a target character selection control corresponding to the target game character is displayed on the character selection control in a preset manner according to the identifier of the target game character.

Specifically, the second display area includes the character selection control. In an optional embodiment, the identifier of the target game character corresponding to the character selection control is acquired in response to a click operation on the character selection control. The identifier of the game character may be avatar or icon indication information of the game character, or name indication information of the game character, etc. The identifier of the game character is not limited here.

Further, the target character selection control corresponding to the target game character is displayed in the preset manner. The preset manner may be highlight, or may be a preset color mark, etc. The preset manner is not limited here.

The following is a further detailed introduction in conjunction with FIG. 3. As shown in FIG. 3, multiple character selection controls 301 are included in a second display area 30. Each character selection control corresponds to a game character or a type of game character. Secondly, in response to a character selection operation 302 acting on the second display area, an identifier of a corresponding target game character is acquired. Here, it is assumed that the identifier of the game character is avatar indication information of this type of game character, that is, avatar information included in the character selection control in FIG. 3.

Further, a target character selection control 303 corresponding to the target game character is displayed in a preset manner according to the identifier of the target game character. It is assumed that the preset manner is highlight display, and the shadow effect is used for indicating highlight display in FIG. 5.

Displaying the target character selection control corresponding to the game character in a preset manner enables a player to quickly determine the currently selected game character, thereby improving the operating efficiency of the game.

In another possible implementation manner, in response to the character selection operation acting on the second display area of the graphical user interface, a target game character in the game scene is selected, and the first display area is controlled to display a game scene area where the current position of the target game character is located.

Specifically, each game character corresponding to the character selection control in the second display area corresponds to a respective game scene area in the game scene. For example, the game characters corresponding to a current character selection control include masters, puppets, and warriors. The game scene area corresponding to a scene map includes gathering places of masters, gathering places of puppets, and gathering places of warriors.

Secondly, in response to the character selection operation that acts on the character selection control for the master, a master group in the game scene is selected, and the first display area is controlled to display the game scene area corresponding to the gathering place of the masters. Further, the selected master group may also be displayed in a preset manner.

In response to the character selection operation, a game screen is controlled to quickly switch to the game scene area where the current position of the target game character is located, so that the user can quickly observe the state of the currently selected target game character to improve the operating efficiency of the game.

In S203, a first perspective switching control and a second perspective switching control are displayed on the second display area.

The first perspective switching control is configured to switch from the game scene area where the current position is located to the game scene area where the target position is located, and the second perspective switching control is configured to switch from the game scene area where the target position is located to the game scene area where the current position is located.

In the present embodiment, the perspective switching control includes a first perspective switching control and a second perspective switching control. The perspective switching control is configured to switch between a game scene area where a current position of the game character is located and a game scene area where a target position of the game character is located.

In an optional embodiment, a lens movement control is displayed on the second display area, and the first perspective switching control and the second perspective switching control are respectively displayed on each side of the lens movement control, which are described in detail below with reference to FIG. 3. As shown in FIG. 3, a lens movement control 304 is displayed on the second display area 30. Further, the first perspective switching control may be displayed on the left side of the lens movement control 304, and the second perspective switching control may be displayed on the right side of the lens movement control 304. The specific setting mode may refer to FIG. 4.

Optionally, the first perspective switching control and the second perspective switching control may also be set as circular buttons, which are respectively arranged on each side of the lens movement control. The specific implementation manners of the first perspective switching control and the second perspective switching control are not limited in the present embodiment, and other implementation manners will be not repeated herein.

In S204, in response to a second touch operation acting on the first display area, an operation position of the second touch operation is acquired.

In the present embodiment, the perspective switching control is configured to switch between the game scene area where the current position of the game character is located and the game scene area where the target position is located. Therefore, the target position is to be determined first.

Specifically, the second touch operation acting on the first display area is responded. The second touch operation may be a long press operation, or a click operation, etc. Secondly, an operation position of the second touch operation is acquired. The operation position may be any position in the first display area, which is not limited in the present embodiment.

In S205, the target position in the first display area is determined according to the operation position.

Further, the target position in the first display area is determined according to the operation position. Optionally, the operation position may be determined to be the target position in the first display area, or the target position in the first display area may also be determined according to a corresponding position of the operation position and the first display area (such as a correspondence between a mini map and an actual game scene). The present embodiment does not limit the specific implementation manner of determining the target position.

In S206, in response to a perspective switching operation acting on the perspective switching control, the first display area is controlled to display a game scene corresponding to the perspective switching operation.

In a possible implementation manner, in response to a first perspective switching operation acting on the first perspective switching control, the first display area is controlled to display the game scene area where the target position is located. The first perspective switching operation is an operation of sliding the lens movement control to the first perspective switching control. The first perspective switching operation will be described below in conjunction with FIG. 4.

As shown in FIG. 4, a perspective movement control 401 and a first perspective switching control 402 are arranged on the second display area. A first perspective movement operation 403 acts on the first perspective switching control 402. The first perspective movement operation 403 is an operation of sliding the lens movement control to the first perspective switching control 402.

Further, in response to the first perspective switching operation 404, the first display area is controlled to display the game scene area of the target position. As shown in FIG. 4, a shadow part 405 indicated by an arrow end point is the target position of the target game character. At this time, the game scene area where the target position is located is displayed.

In another possible implementation manner, in response to a second perspective switching operation acting on the second perspective switching control, the first display area is controlled to display the game scene area where the current position is located. The second perspective switching operation is an operation of sliding the lens movement control to the first perspective switching control. The second perspective switching operation will be described below in conjunction with FIG. 5.

As shown in FIG. 5, a perspective movement control 501 and a first perspective switching control 502 are arranged on the second display area. A second perspective switching operation 503 acts on the second perspective switching control 502. The second perspective switching operation 503 is an operation of sliding the lens movement control to the first perspective switching control 502.

Further, in response to the second perspective switching operation 503, the second display area is controlled to display the game scene area where the current position is located. As shown in FIG. 5, a shadow part 504 indicated by an arrow start point is the current position of the game character. At this time, the game scene area where the current position is located is displayed.

The game perspective control method provided by the embodiment of the present disclosure includes: in response to the character selection operation acting on the second display area of the graphical user interface, an identifier of a target game character corresponding to the character selection operation is acquired. A target character selection control corresponding to the target game character is displayed on the character selection control in a preset manner according to the identifier of the target game character. A first perspective switching control and a second perspective switching control are displayed on the second display area.

In response to a second touch operation acting on the first display area, an operation position of the second touch operation is acquired. The target position in the first display area is determined according to the operation position. In response to a perspective switching operation acting on the perspective switching control, the first display area is controlled to display a game scene corresponding to the perspective switching operation. Through displaying the first perspective switching control and the second perspective switching control in the second display area, and secondly, through operating the first perspective switching control and the second perspective switching control through the lens movement control to realize the switching of the game perspective, the switching of perspectives can be quickly and conveniently realized, thereby avoiding frequent player operations and effectively improving game efficiency.

On the basis of the above embodiments, the implementation manner of switching the perspective movement control to the perspective switching control to provide the perspective switching control will be described with reference to FIG. 6 to FIG. 7.

Figure 6:
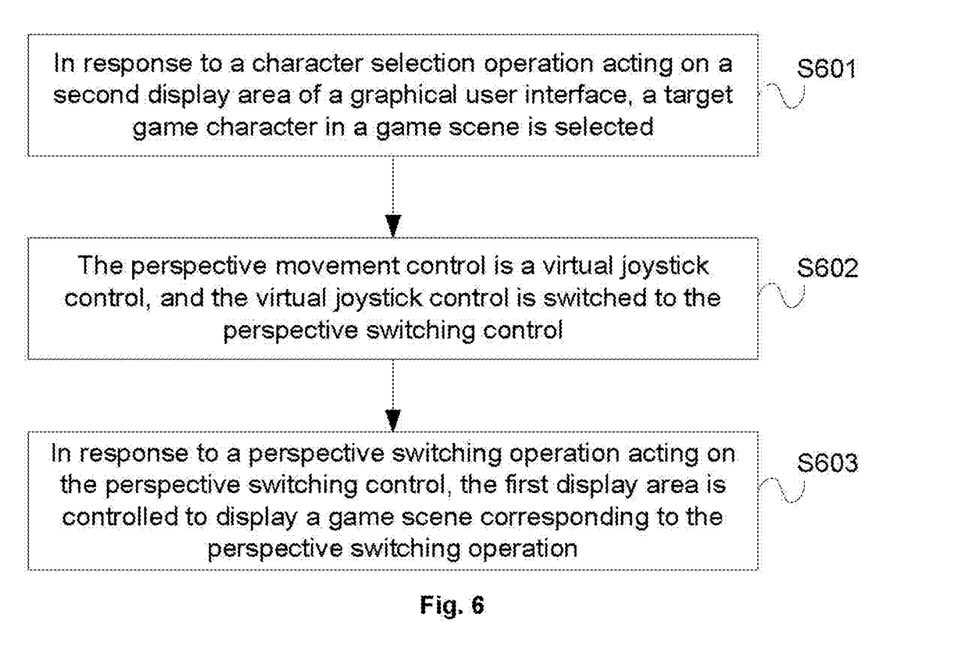
FIG. 6 is a flowchart of a game perspective control method according to a third embodiment of the present disclosure.

FIG. 6 is a flowchart of a game perspective control method according to a third embodiment of the present disclosure. FIG. 7 is an interface schematic diagram of a game perspective control method according to a fourth embodiment of the present disclosure.

As shown in FIG. 6, the method includes the following steps.

In S601, in response to a character selection operation acting on a second display area of a graphical user interface, a target game character in a game scene is selected.

Specifically, the implementation manner of step S601 is similar to S101, and will not be repeated here.

In S602, the perspective movement control is a virtual joystick control, and the virtual joystick control is switched to the perspective switching control.

In the specific implementation process, the perspective movement control is configured to control the display of the game scene area on the first display area. The perspective movement control is a virtual joystick control. For example, the first display area is controlled by operating a direction of the virtual joystick control to move the game scene according to the direction, thereby displaying the corresponding game scene area.

Figure 7:
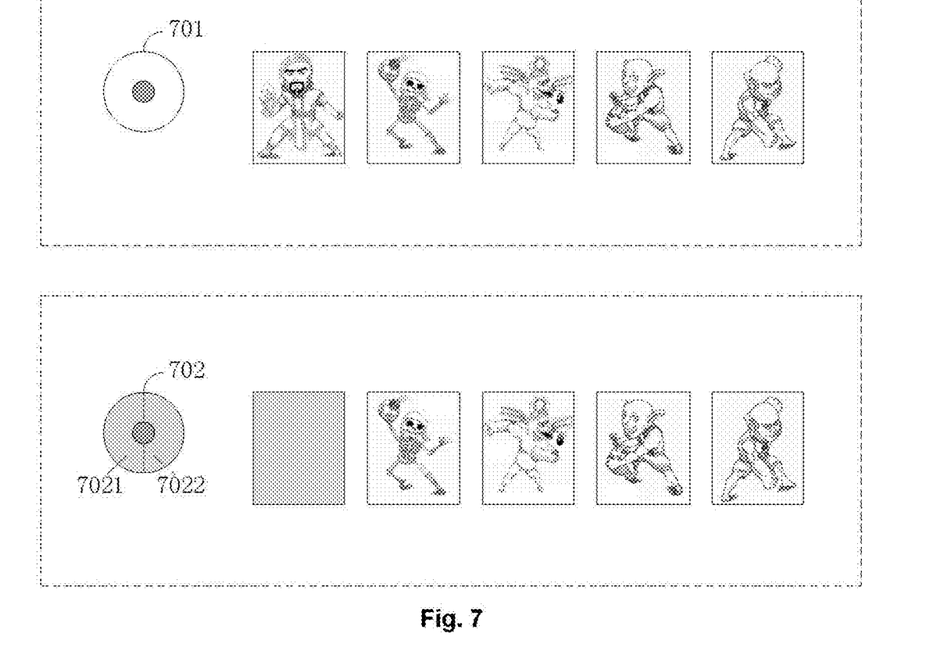
FIG. 7 is an interface schematic diagram of a game perspective control method according to a fourth embodiment of the present disclosure.

As shown in FIG. 7, a perspective movement control 701 is a virtual joystick control. For example, the direction of the virtual joystick control is controlled toward the upper left, thereby controlling the game scene in the first display area to move continuously until the operation of the virtual joystick control stops, thereby displaying the game scene area corresponding to a stop position.

In the present embodiment, after the target game character is selected, the virtual joystick control is switched to a perspective switching control. The perspective switching control is configured to switch between a game scene area where a current position of the target game character is located and a game scene area where a target position is located.

In an optional embodiment, the perspective switching control is a virtual joystick control. Those skilled in the art can understand that the perspective movement control and the perspective switching control may be presented as exactly the same control, but the functions are different, as shown in FIG. 7. The perspective movement control 701 is configured to control the display of the game scene area in the first display area when the target game character is not selected.

Secondly, a perspective switching control 702 is configured to switch between the game scene area where the current position of the target game character is located and the game scene area where the target position of the target game character is located when the target game character is selected. Through switching the perspective movement control to the perspective switching control, the switch of the game scene area can be realized on the basis of original controls, thereby saving resources and expanding the role of the control.

Optionally, after the virtual joystick control is switched to the perspective switch control, the virtual joystick control may be displayed in a preset manner, such as highlighting and preset color display, as shown in the shadow effect of the perspective switching control 702 in FIG. 7.

Or, preset information may also be displayed in the second display area. The preset information is configured to indicate that the current virtual joystick control is a perspective switching control, so that the user can quickly obtain the specific function of the current virtual joystick control to improve the game efficiency.

Further, the first perspective switching control is a first side control of the virtual joystick control, and the second perspective switching control is a second side control of the virtual joystick control. For example, the virtual joystick control may be divided into areas to obtain the first side control corresponding to a first side, and the second side control corresponding to a second side.

As shown in FIG. 7, dotted lines are displayed in the perspective switching control 702 to indicate a first side control 7021 and a second side control 7022. In actual settings, the dotted lines may be displayed in the virtual joystick control or not, which is not limited herein. The divided areas may be, for example, the left and right sides shown in FIG. 7, and may also be the upper side and the lower side, etc., which is not limited in the present embodiment.

In S603, in response to a perspective switching operation acting on the perspective switching control, the first display area is controlled to display a game scene corresponding to the perspective switching operation.

The implementation manner of S603 is similar to S103, and will not be repeated here.

The game perspective control method provided by the embodiment of the present disclosure includes: in response to a character selection operation acting on a second display area of a graphical user interface, a target game character in a game scene is selected. The perspective movement control is a virtual joystick control, and the virtual joystick control is switched to the perspective switching control. In response to a perspective switching operation acting on the perspective switching control, the first display area is controlled to display a game scene corresponding to the perspective switching operation. Through switching the perspective movement control to the perspective switching control, the first display area is controlled to display the game scene corresponding to the perspective switching operation acting on the perspective switching control, thereby providing the perspective switching control on the basis of an original control without adding new controls, so that game resources are saved, and control functions are expanded.

Figure 8:
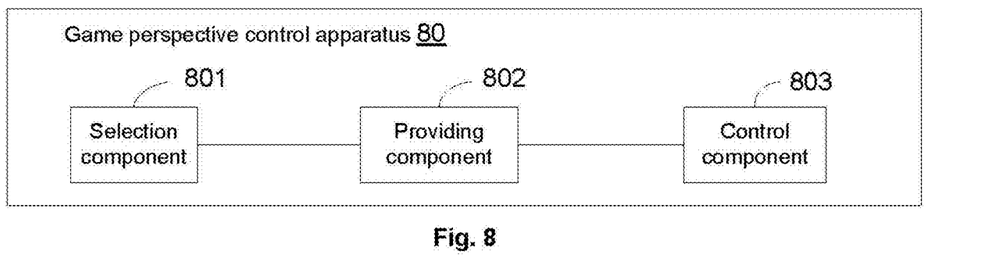
FIG. 8 is a structural schematic diagram of a game perspective control apparatus according to a first embodiment of the present disclosure.

FIG. 8 is a structural schematic diagram of a game perspective control apparatus according to a first embodiment of the present disclosure. As shown in FIG. 8, the apparatus 80 includes: a selection component 801, a providing component 802, and a control component 803.

The selection component 801 is configured to select, in response to a character selection operation acting on the second display area of the graphical user interface, a target game character in the game scene.

The providing component 802 is configured to provide a perspective switching control on the second display area. The perspective switching control is configured to switch between a game scene area where a current position of the target game character is located and a game scene area where a target position of the target game character is located.

The control component 803 is configured to control, in response to a perspective switching operation acting on the perspective switching control, the first display area to display a game scene corresponding to the perspective switching operation.

Optionally, the providing component 802 is configured to:
display a first perspective switching control and a second perspective switching control on the second display area.

The first perspective switching control is configured to switch from the game scene area where the current position is located to the game scene area where the target position is located, and the second perspective switching control is configured to switch from the game scene area where the target position is located to the game scene area where the current position is located.

Optionally, the providing component 802 is configured to:
display a lens movement control on the second display area, and display the first perspective switching control and the second perspective switching control on each side of the lens movement control respectively.

Optionally, the control component 803 is configured to:
control, in response to a first perspective switching operation acting on the first perspective switching control, the first display area to display the game scene area where the target position is located, the first perspective switching operation being an operation of sliding the lens movement control to the first perspective switching control; or,
control, in response to a second perspective switching operation acting on the second perspective switching control, the first display area to display the game scene area where the current position is located, the second perspective switching operation being an operation of sliding the lens movement control to the first perspective switching control.

The apparatus provided in the present embodiment may be configured to execute the technical solutions of the foregoing method embodiments, and the implementation principles and technical effects are similar. The present embodiment will not be described here.

Figure 9:
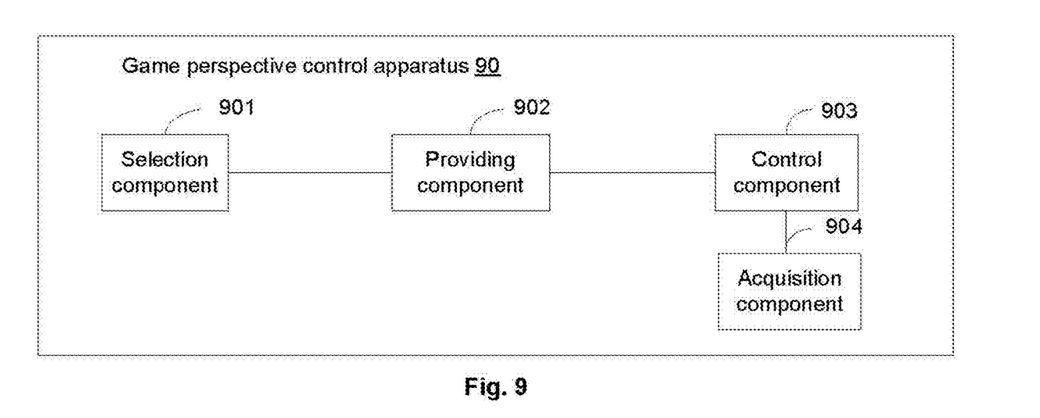
FIG. 9 is a structural schematic diagram of a game perspective control apparatus according to a second embodiment of the present disclosure.

FIG. 9 is a structural schematic diagram of a game perspective control apparatus according to a second embodiment of the present disclosure. As shown in FIG. 9, on the basis of the embodiment of FIG. 9, the present embodiment further includes: an acquisition component 904.

Optionally, the acquisition component 904 is configured to: acquire, in response to a second touch operation acting on the first display area, an operation position of the second touch operation before controlling, in response to the perspective switching operation acting on the perspective switching control, the first display area to display the game scene corresponding to the perspective switching operation; and
determine, according to the operation position, the target position on the first display area.

Optionally, the selection component 901 is configured to: acquire, in response to the character selection operation acting on the second display area of the graphical user interface, an identifier of a target game character corresponding to the character selection operation; and display, according to the identifier of the game character, a target character selection control corresponding to the target game character on the character selection control in a preset manner.

Optionally, the selection component 901 is configured to:

select, in response to the character selection operation acting on the second display area of the graphical user interface, the target game character in the game scene, and control the first display area to display the game scene area where the current position of the target game character is located.

Optionally, the providing component 902 is configured to:

switch the perspective movement control to the perspective switching control.

Optionally, the perspective movement control is a virtual joystick control, and the providing component 902 is configured to:

switch the virtual joystick control to the perspective switching control.

Optionally, the perspective switching control is a virtual joystick control, the first perspective switching control is a first side control of the virtual joystick control, and the second perspective switching control is a second side control of the virtual joystick control.

Optionally, the perspective movement control is configured to control the game scene area displayed on the first display area.

The apparatus provided in the present embodiment may be configured to execute the technical solutions of the foregoing method embodiments, and the implementation principles and technical effects are similar. The present embodiment will not be described here.

Figure 10:
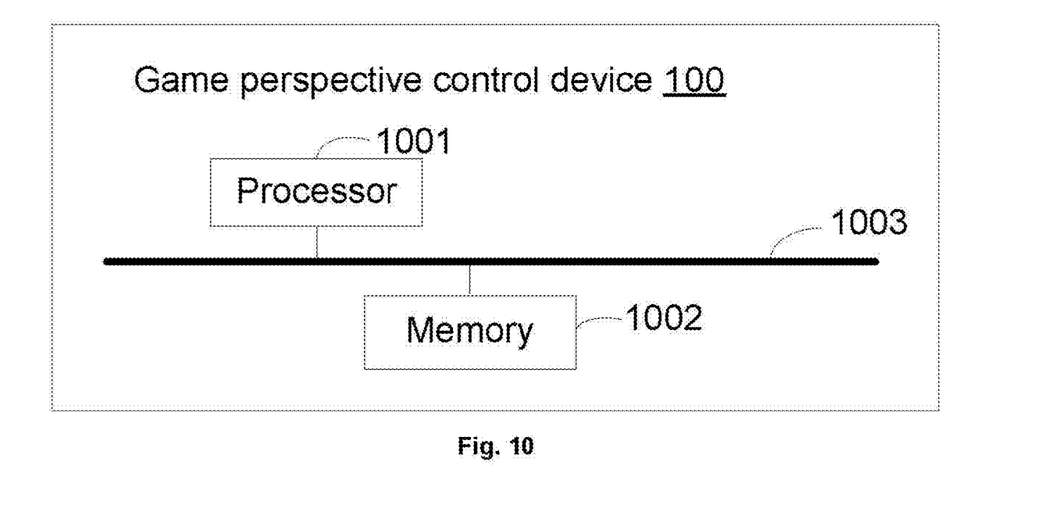
FIG. 10 is a hardware structural schematic diagram of a game perspective control device according to an embodiment of the present disclosure.

FIG. 10 is a hardware structural schematic diagram of a game perspective control device according to an embodiment of the present disclosure. As shown in FIG. 10, a game perspective control device 100 of the present embodiment includes: a processor 1001 and a memory 1002.

The memory 1002 is configured to store a computer-executable instruction.

The processor 1001 is configured to execute the computer-executable instruction stored in the memory to implement various steps performed by the game perspective control method in the above embodiments. For details, reference may be made to the related description in the foregoing method embodiments.

Optionally, the memory 1002 may be independent or integrated with the processor 1001.

When the memory 1002 is independently arranged, the game perspective control device further includes a bus 1003 configured to connect the memory 1002 and the processor 1001.

An embodiment of the present disclosure also provides a computer-readable storage medium that stores a computer-executable instruction. When a processor executes the computer-executable instruction, the game perspective control method performed by the game perspective control device is implemented.

In some embodiments provided by the present disclosure, it is to be understood that the disclosed device and method may be implemented in another manner. For example, the device embodiment described above is schematic, and for example, division of the components is logic function division, and other division manners may be adopted during practical implementation. For example, multiple components may be combined or integrated into another system, or some characteristics may be neglected or not executed. In addition, coupling or direct coupling or communication connection between each displayed or discussed component may be indirect coupling or communication connection, implemented through some interfaces, of the device or the components, and may be electrical and mechanical or adopt other forms.

The integrated component implemented in the form of a software functional component may be stored in a computer-readable storage medium. The software functional component is stored in a storage medium, including a plurality of instructions enabling a computer device (which may be a personal computer, a server, a network device or the like) or a processor to execute part of the steps of the method in each embodiment of the application.

It should be understood that the processor may be a Central Processing Unit (CPU), or may be other general purpose processors, a Digital Signal Processor (DSP), an Application Specific Integrated Circuit (ASIC), or the like. The general purpose processor may be a microprocessor, or the processor may also be any conventional processor, etc. The steps of the method disclosed in combination with the present disclosure may be directly embodied as a hardware processor for execution and completion, or a combination of hardware and software components in the processor for execution and completion.

The memory may include a high-speed RAM, may also include a Non-Volatile Memory (NVM) such as at least one magnetic disk memory, and may also be a U disk, a mobile hard disk, a ROM, a magnetic disk, or an optical disk.

The bus may be an Industry Standard Architecture (ISA) bus, a Peripheral Component (PCI) bus, or an Extended Industry Standard Architecture (EISA) bus. The bus may be divided into an address bus, a data bus, a control bus, and the like. For ease of representation, the bus in the drawings of the application does not limit to one bus or one type of bus.

The above storage medium may be implemented by any type of volatile or non-volatile storage device or a combination thereof, such as a Static Random Access Memory (SRAM), an Electrically Erasable Programmable Read Only Memory (EEPROM), an Erasable Programmable Read Only Memory (EPROM), a Programmable Read Only Memory (PROM), a ROM, a magnetic memory, a flash memory, a magnetic disk or an optical disk. The storage medium may be any available medium that can be accessed by a general purpose or special purpose computer.

Those of ordinary skill in the art may understand that all or part of the steps of the foregoing method embodiments may be completed by a program instructing relevant hardware. The foregoing program may be stored in a computer-readable storage medium. When the program is executed, the steps including the foregoing method embodiments are performed. The foregoing storage medium includes various media capable of store program codes, such as a ROM, a RAM, a magnetic disk, or an optical disk.

Finally, it is to be noted that the above embodiments are only used to illustrate the technical solutions of the present disclosure, and are not limited thereto. Although the present disclosure has been described in detail with reference to the foregoing embodiments, those skilled in the art should understand that the technical solutions described in the foregoing embodiments are modified, or some or all technical features are equivalently replaced, but the modifications and replacements do not make the essence of the corresponding technical solutions depart from the scope of the technical solutions of various embodiments of the present disclosure.

INDUSTRIAL APPLICABILITY

The solution provided by the embodiments of the present disclosure may be applied to perspective switching in a game scene. Through operating a perspective switching control in a graphical user interface, switching between a game scene area where a current position of a game character is located and a game scene area where a target position is located in a first display area is implemented, thereby solving the problem of low perspective switching efficiency caused by switching a game perspective using a continuous sliding operation, and improving the game experience of a user.

What is claimed is:

1. A game perspective control method, applied to a terminal capable of rendering a graphical user interface, the graphical user interface comprising a first display area and a second display area, the first display area comprising at least part of a game scene, the second display area comprising a perspective movement control and a character selection control, the method comprising:
   selecting, in response to a character selection operation acting on the second display area of the graphical user interface, a target game character in the game scene;
   providing a perspective switching control on the second display area, the perspective switching control being configured to switch between a game scene area where a current position of the target game character is located and a game scene area where a target position of the target game character is located; and
   controlling, in response to a perspective switching operation acting on the perspective switching control, the first display area to display a game scene corresponding to the perspective switching operation;
   before controlling, in response to the perspective switching operation acting on the perspective switching control, the first display area to display the game scene corresponding to the perspective switching operation, the method further comprises:
   acquiring, in response to a second touch operation acting on the first display area, an operation position of the second touch operation; and
   determining, according to the operation position, the target position on the first display area.

2. The method as claimed in claim 1, wherein providing the perspective switching control on the second display area comprises:
   displaying a first perspective switching control and a second perspective switching control on the second display area,
   wherein the first perspective switching control is configured to switch from the game scene area where the current position is located to the game scene area where the target position is located, and the second perspective switching control is configured to switch from the game scene area where the target position is located to the game scene area where the current position is located.

3. The method as claimed in claim 2, wherein displaying the first perspective switching control and the second perspective switching control on the second display area comprises:
   displaying a lens movement control on the second display area, and displaying the first perspective switching control and the second perspective switching control on each side of the lens movement control respectively.

4. The method as claimed in claim 3, wherein controlling, in response to the perspective switching operation acting on the perspective switching control, the first display area to display the game scene corresponding to the perspective switching operation comprises:
   controlling, in response to a first perspective switching operation acting on the first perspective switching control, the first display area to display the game scene area where the target position is located, the first perspective switching operation being an operation of sliding the lens movement control to the first perspective switching control; or,
   controlling, in response to a second perspective switching operation acting on the second perspective switching control, the first display area to display the game scene area where the current position is located, the second perspective switching operation being an operation of sliding the lens movement control to the first perspective switching control.

5. The method as claimed in claim 2, wherein selecting, in response to the character selection operation acting on the second display area of the graphical user interface, the target game character in the game scene comprises:
   acquiring, in response to an character selection operation acting on the second display area of the graphical user interface, an identifier of a target game character corresponding to the character selection operation; and
   displaying, according to the identifier of the target game character, a target character selection control corresponding to the target game character on the character selection control in a preset manner.

6. The method as claimed in claim 2, wherein the perspective switching control is a virtual joystick control, the first perspective switching control is a first side control of the virtual joystick control, and the second perspective switching control is a second side control of the virtual joystick control.

7. The method as claimed in claim 1, wherein selecting, in response to the character selection operation acting on the second display area of the graphical user interface, the target game character in the game scene comprises:
   selecting, in response to the character selection operation acting on the second display area of the graphical user interface, the target game character in the game scene, and controlling the first display area to display the game scene area where the current position of the target game character is located.

8. The method as claimed in claim 1, wherein providing the perspective switching control on the second display area comprises:
   switching the perspective movement control to the perspective switching control.

9. The method as claimed in claim 8, wherein the perspective movement control is a virtual joystick control, and switching the perspective movement control to the perspective switching control comprises:
   switching the virtual joystick control to the perspective switching control.

10. The method as claimed in claim 1, wherein the perspective movement control is configured to control the game scene area displayed on the first display area.

11. The method as claimed in claim 1, wherein the second display area is stacked and displayed above the first display area; or,
   the first display area is located on the left side of the graphical user interface, and the second display area is located on the right side of the graphical user interface.

12. The method as claimed in claim 1, wherein the character selection operation is an operation of clicking a specific character selection control, or an operation of slidably selecting a plurality of character selection controls.

13. The method as claimed in claim 1, wherein one character selection control corresponds to one game character, or corresponds to a plurality of game characters.

14. The method as claimed in claim 1, wherein the game scene area where the current position is located is a game scene area centered on the current position of the target game character and within a preset range size.

15. The method as claimed in claim 1, wherein the target game scene area is centered on the target position of the target game character and within a preset range size.

16. The method as claimed in claim 1, wherein the perspective switching control is divided into a left sub-control and a right sub-control, when the perspective switching operation is performed on the left sub-control, the game scene where the current position is located is switched to the game scene where the target position is located, and when the perspective switching operation is performed on the right sub-control, the game scene where the target position is located is switched to the game scene where the current position is located.

17. The method as claimed in claim 1, wherein the perspective switching control is divided into two separate buttons, when the perspective switching operation is performed on one separate button, the game scene where the current position is located is switched to the game scene where the target position is located, and when the perspective switching operation is performed on another separate button, the game scene where the target position is located is switched to the game scene where the current position is located.

18. A game perspective control device, comprising:
a memory, configured to store a program; and
a processor, configured to execute the program stored in the memory, wherein when the program is executed, the processor is configured to perform the following steps:
selecting, in response to a character selection operation acting on the second display area of the graphical user interface, a target game character in the game scene;
providing a perspective switching control on the second display area, the perspective switching control being configured to switch between a game scene area where a current position of the target game character is located and a game scene area where a target position of the target game character is located; and
controlling, in response to a perspective switching operation acting on the perspective switching control, the first display area to display a game scene corresponding to the perspective switching operation;
before controlling, in response to the perspective switching operation acting on the perspective switching control, the first display area to display the game scene corresponding to the perspective switching operation, acquiring, in response to a second touch operation acting on the first display area, an operation position of the second touch operation; and
determining, according to the operation position, the target position on the first display area.

19. A non-transitory computer-readable storage medium, comprising instructions that, when run on a computer, cause the computer to perform the following steps:
selecting, in response to a character selection operation acting on the second display area of the graphical user interface, a target game character in the game scene;
providing a perspective switching control on the second display area, the perspective switching control being configured to switch between a game scene area where a current position of the target game character is located and a game scene area where a target position of the target game character is located; and
controlling, in response to a perspective switching operation acting on the perspective switching control, the first display area to display a game scene corresponding to the perspective switching operation;
before controlling, in response to the perspective switching operation acting on the perspective switching control, the first display area to display the game scene corresponding to the perspective switching operation, acquiring, in response to a second touch operation acting on the first display area, an operation position of the second touch operation; and
determining, according to the operation position, the target position on the first display area.

* * * * *